United States Patent
Seok (10) Patent No.: US 8,279,757 B2
(45) Date of Patent: Oct. 2, 2012

(54) POWER MANAGEMENT IN TUNNELED DIRECT LINK SETUP

(75) Inventor: Yong Ho Seok, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/062,944

(22) PCT Filed: Sep. 11, 2009

(86) PCT No.: PCT/KR2009/005156
§ 371 (c)(1),
(2), (4) Date: Apr. 22, 2011

(87) PCT Pub. No.: WO2010/030136
PCT Pub. Date: Mar. 18, 2010

(65) Prior Publication Data
US 2011/0188429 A1    Aug. 4, 2011

Related U.S. Application Data

(60) Provisional application No. 61/096,292, filed on Sep. 11, 2008.

(51) Int. Cl.
*H04L 1/14* (2006.01)
*G08C 17/00* (2006.01)
*H04B 7/185* (2006.01)
*H04B 1/38* (2006.01)
*H04W 4/00* (2009.01)

(52) U.S. Cl. ........ 370/235; 370/311; 370/318; 370/332; 455/574

(58) Field of Classification Search .......... 370/229, 370/235, 252, 311, 318, 322, 324, 328–329, 370/331–333, 338, 445, 447, 468; 455/411, 455/432.1, 550.1, 552.1, 574
See application file for complete search history.

(56) References Cited

U.S. PATENT DOCUMENTS

| | | | | |
|---|---|---|---|---|
| 7,245,946 | B2* | 7/2007 | Liu | 455/574 |
| 7,519,032 | B2* | 4/2009 | Soomro et al. | 370/338 |
| 7,813,307 | B2* | 10/2010 | Kakani | 370/311 |
| 2006/0165035 | A1 | 7/2006 | Chandra et al. | |
| 2006/0285526 | A1* | 12/2006 | Jang et al. | 370/338 |
| 2007/0036097 | A1 | 2/2007 | Costa et al. | |
| 2007/0047482 | A1 | 3/2007 | Costa et al. | |
| 2008/0069047 | A1 | 3/2008 | Yee et al. | |
| 2008/0219228 | A1* | 9/2008 | Seok et al. | 370/338 |
| 2009/0073945 | A1* | 3/2009 | Seok | 370/338 |
| 2009/0274135 | A1* | 11/2009 | Seok | 370/338 |
| 2009/0290521 | A1* | 11/2009 | Itagaki | 370/311 |
| 2010/0008274 | A1* | 1/2010 | Kneckt et al. | 370/311 |
| 2010/0271995 | A1* | 10/2010 | Seok et al. | 370/311 |
| 2011/0007692 | A1* | 1/2011 | Seok | 370/328 |
| 2011/0305216 | A1* | 12/2011 | Seok | 370/329 |

* cited by examiner

*Primary Examiner* — Tri H Phan
(74) *Attorney, Agent, or Firm* — Lee, Hong, Degerman, Kang & Waimey

(57) ABSTRACT

A method and apparatus of managing power save in a wireless network is provided. A direct link with a peer station (STA) is established by exchanging a Tunneled Direct Link Setup (TDLS) setup request frame and a TDLS setup response frame through a access point (AP). The peer STA enters power save mode (PSM). Traffic data that are destined for the peer STA in the PSM are buffered and a peer traffic indication (PTI) frame is transmitted to the peer STA in the PSM. The PTI frame includes a traffic identifier (TID) field and a sequence control field. Unnecessary allocation of service period can be prevented.

7 Claims, 4 Drawing Sheets

POWER MANAGEMENT IN TUNNELED DIRECT LINK SETUP

CROSS-REFERENCE TO RELATED APPLICATIONS

This application is a 371 U.S. national stage application of International Application No. PCT/KR2009/005156, filed on Sep. 11, 2009, which claims priority to U.S. Provisional Application Ser. No. 61/096,292, filed on Sep. 11, 2008, the contents of which are incorporated by reference herein in their entirety.

TECHNICAL FIELD

The present invention relates to a wireless local area network (WLAN), and more particularly, to a method and apparatus of managing power save supporting a tunneled direct link setup (TDLS) in a WLAN system.

BACKGROUND ART

With development of information communication technologies, a variety of wireless communication technologies have been developed. A wireless local area network (WLAN) is a technology permitting wireless access to Internet in specific service areas such as home or companies or air planes by the use of portable terminals such as a personal digital assistant (PDA), a laptop computer, and a portable multimedia player (PMP) on the basis of a radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN stage, a data rate of 1 to 2 Mbps was supported by the use of frequency hopping, spread spectrum, and infrared communication using a frequency of 2.4 GHz. In recent years, with the development of the wireless communication technology, a data rate of 54 Mbps can be supported by applying the orthogonal frequency division multiplex (OFDM) technology, etc. to the WLAN. In addition, the WLAN has developed or is developing wireless communication technologies for improvement in quality of service (QoS), compatibility of an access point (AP) protocol, security enhancement, wireless resource measurement, wireless access in vehicular environment, fast roaming, mesh network, inter-working with external networks, wireless network management, and the like.

In the system based on Institute of Electrical and Electronics Engineers (IEEE) 802.11 standard, a basic service set (BSS) means a set of stations (STAs) successfully synchronized. A basic service area (BSA) means an area including members of the BSS. The BSA can vary depending on propagation characteristics of a wireless medium. The BSS can be basically classified into two kinds of an independent BSS (IBSS) and an infrastructured BSS. The former means a BSS that constitutes a self-contained network and that is not permitted to access a distribution system (DS). The latter means a BSS that includes one or more access points (APs) and a distribution system and that uses the APs in all the communication processes including communications between the stations.

Before the IEEE 802.11e standard which is published on 11 Nov. 2005 and is incorporated by reference, the infrastructured BSS required to transmit data necessarily through the AP without permitting the direct transmission of data between non-AP stations (non-AP STAs). STAs are not allowed to transmit frames directly to other STAs in a BSS and should always rely on the AP for the delivery of the frames. The IEEE 802.11e standard agreed a direct link setup (DLS) between the non-AP STAs to improve the efficiency of WLAN. A QBSS is a BSS supporting quality of service (QoS). A QSTA is a STA supporting QoS. A legacy STA is a STA not supporting QoS. A QAP is a AP supporting QoS. The QBSS includes QSTAs and one or more QAPs. QSTAs may transmit frames directly to another QSTA by setting up such data transfer using DLS. Non-AP QSTAs can set up a direct link and directly communicate with each other through the direct link. The direct link is a unidirectional link from one non-AP QSTA to another non-AP QSTA operating in the same infrastructure QBSS that does not pass through a QAP. Once the direct link has been set up, all frames between the two non-AP QSTAs are exchanged directly.

To set up the direct link, the two non-AP QSTAs exchanges a DLS request frame and a DLS response frame via the QAP. This means setting up DLS rely on the QAP. The WLAN system currently used is generally based on the IEEE 802.11a/b/g standard. This means QBSS is not the basic BSS. The non-AP STAs may be QSTAs supporting the QoS but the AP may be a legacy AP not supporting the QoS. As a result, non-AP QSTA cannot utilize the DLS service since legacy APs cannot support the DLS service.

STAs can operate in one of two power management modes of an active mode (AM) and a power save mode (PSM). Since the non-AP STA is generally a user's portable device, it is necessary to support the PSM so as to effectively manage the power. In the IEEE 802.11e standard, power management is called as automatic power save delivery (APSD). The APSD defines two delivery mechanisms, namely unscheduled APSD (U-APSD) and scheduled APSD (S-APSD).

In the direct link, power management is also needed. IEEE 802.11e standard provides APSD support in the QBSS. After establishing DLS, one QSTA in AM or PSM transmits a data frame and/or a management frame to the other QSTA in PSM or AM via the direct link. But when non-AP QSTAs and a legacy AP are co-exists, IEEE 802.11e standard does not disclose how to establish the direct link and how to manage PSM.

DISCLOSURE OF INVENTION

Technical Problem

The present invention provides a method and apparatus of power management in a wireless network supporting TDLS.

The present invention also provides a method and apparatus of power management in a TDLS link to improve efficiency of radio resources.

Solution to Problem

In an aspect, a method of managing power save in a wireless network is provided. The method includes establishing a direct link with a peer station (STA) by exchanging a Tunneled Direct Link Setup (TDLS) setup request frame and a TDLS setup response frame through a access point (AP), receiving an indicator indicating that the peer STA enters power save mode (PSM) via the direct link, buffering traffic data that are destined for the peer STA in the PSM, and transmitting a peer traffic indication (PTI) frame to the peer STA in the PSM. The PTI frame indicates a state of a frame buffer for the peer STA. The PTI frame includes a traffic identifier (TID) field that indicates the highest TID for which the peer STA has buffered traffic.

The PTI frame may further include a sequence control field that is set to the sequence number of the latest traffic data transmitted to the peer STA from the TID indicated in the TID field. The PTI frame may further include a AC traffic available field indicating a non-empty access category (AC). The PTI frame may further include information that identifies the direct link.

The indicator may be a power management field in a frame control field of a frame and the peer STA enter the PSM by setting the power management field.

The method further includes receiving a trigger frame from the peer STA as a response of the PTI frame, the trigger frame indicating that the peer STA is in active mode.

The TDLS setup request frame and a TDLS setup response frame may be encapsulated in data frames in order to allow the TDLS setup request frame and a TDLS setup response frame to be transmitted through the AP transparently.

In another aspect, a method of managing power save in a wireless network is provided. The method includes establishing a direct link with a peer station (STA) by exchanging a Tunneled Direct Link Setup (TDLS) setup request frame and a TDLS setup response frame through a access point (AP), entering power save mode (PSM) by notifying the peer STA through the direct link, and changing power management mode from the PSM to active mode when a peer traffic indication (PTI) frame is received from the peer STA, the PTI frame indicating a state of a frame buffer which is buffered by the peer STA. The PTI frame includes a traffic identifier (TID) field that indicates the highest TID for which the peer STA has buffered traffic.

In still another aspect, an apparatus supporting TDLS includes a radio frequency (RF) unit to transmit and receive radio signals, and a processor operatively coupled with the RF unit. The processor is configured to establish a direct link with a peer station (STA) by exchanging a Tunneled Direct Link Setup (TDLS) setup request frame and a TDLS setup response frame through a access point (AP), receive an indicator indicating that the peer STA enters power save mode (PSM) via the direct link, buffer traffic data that are destined for the peer STA in the PSM, and transmit a peer traffic indication (PTI) frame to the peer STA in the PSM, the PTI frame indicating a state of a frame buffer for the peer STA. The PTI frame includes a traffic identifier (TID) field that indicates the highest TID for which the peer STA has buffered traffic.

In still another aspect, an apparatus supporting TDLS includes a radio frequency (RF) unit to transmit and receive radio signals, and a processor operatively coupled with the RF unit. The processor is configured to establish a direct link with a peer station (STA) by exchanging a Tunneled Direct Link Setup (TDLS) setup request frame and a TDLS setup response frame through a access point (AP), enter power save mode (PSM) by notifying the peer STA through the direct link, and change power management mode from the PSM to active mode when a peer traffic indication (PTI) frame is received from the peer STA, the PTI frame indicating a state of a frame buffer which is buffered by the peer STA.

ADVANTAGEOUS EFFECTS OF INVENTION

During power management through a TDLS direct link, utilization of radio resources can be improved. Unnecessary allocation of service period can be prevented.

BEST MODE FOR CARRYING OUT THE INVENTION

Exemplary embodiments of the present invention will now be described in detail with reference to the accompanying drawings. In the following description, a wireless local area network (WLAN) system as a wireless communication system will be taken as an example. But this is merely illustrative and the present invention can be applicable in the same manner to any other wireless communication systems besides the WLAN system except for a case not allowed in terms of its properties. Terms or words unique to the WLAN system used in the embodiments of the present invention may be properly changed to other terms or words commonly used in a corresponding wireless communication system.

Figure 1:
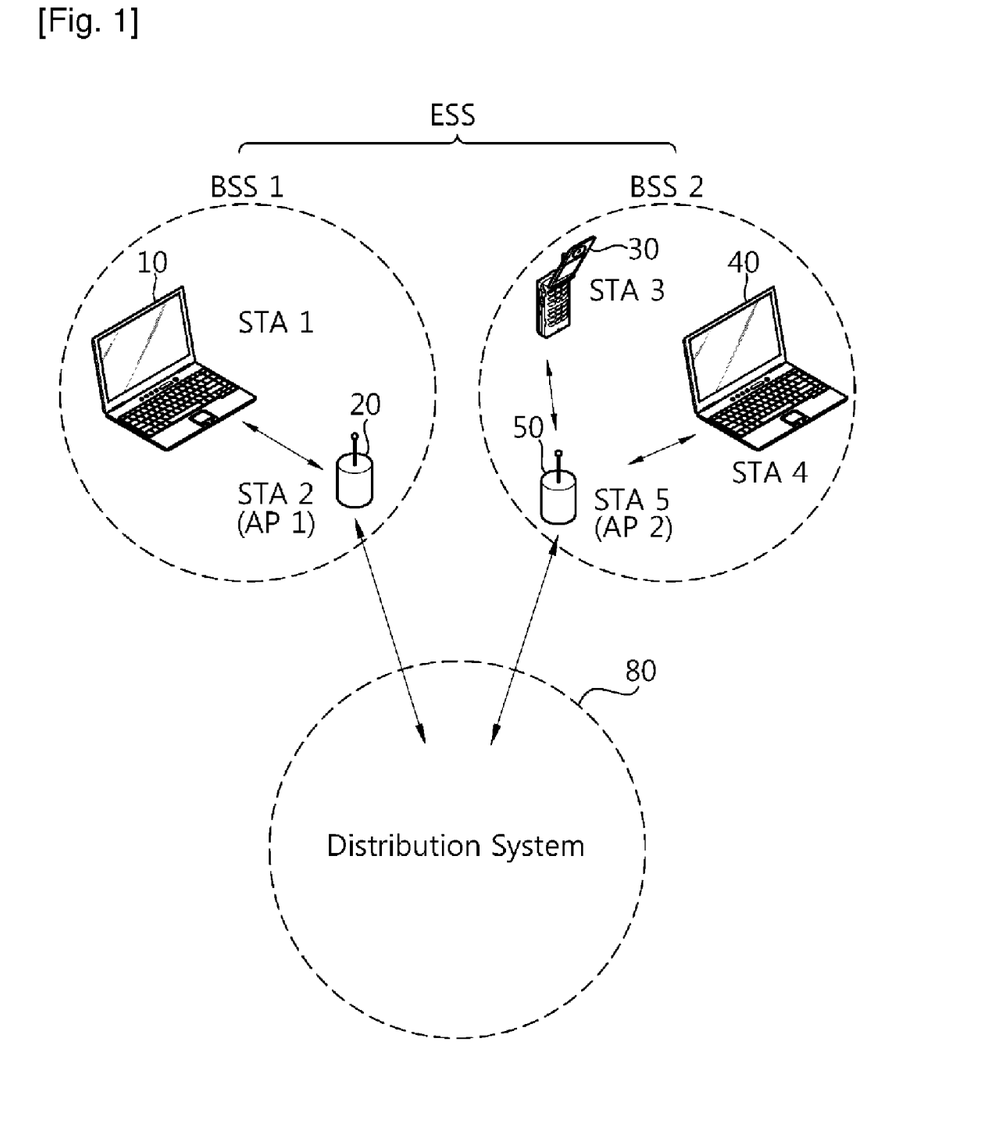
FIG. 1 illustrates a WLAN system for implementing embodiments of the present invention.

FIG. 1 illustrates a WLAN system for implementing embodiments of the present invention. The WLAN system includes one or more basic service sets (BSSs). The BSS refers to a set of stations (STA) that can communicate with each other in synchronization, which does not indicate a particular area. The BSS may be classified into an infrastructure BSS and an independent BSS (IBSS). FIG. 1 shows the infrastructure BSS. The infrastructure BSS include one or more STAs. A first BSS BSS1 includes STA1 10, and STA2 20. A second BSS BSS2 includes STA3 30, STA4 40 and STA5 50. In each infrastructure BSS, at least one access point (AP) may exist. The AP is a station for providing a distribution service. The STA2 20 in the first BSS BSS1 may be a AP1 and the STA5 50 in the first BSS BSS2 may be a AP2. A distribution system (DS) 80 connects a plurality of APs (AP1 and AP2). Meanwhile, the IBSS, not including an AP, includes STAs, all of which are mobile stations, and forms a self-contained network without allowing a connection to the DS 80.

The STA is a certain function medium including a medium access control (MAC) following the stipulation of IEEE 802.11 standard and a physical layer interface with respect to a wireless medium. The STA may be called as a node. The STA may be an AP or non-AP.

Non-AP STAs (STA1 10, STA3 30, STA4 40, STA6 60, STAT 70, and STA8 80) may be a mobile terminal manipulated by a user. The non-AP STA may be referred to by other names such as wireless transmit/receive unit (WTRU), user equipment (UE), mobile station (MS), mobile terminal (MT), mobile subscriber unit, or the like.

The APs (AP1 and AP2) provide an access to the DS 80 by way of a wireless medium for STAs associated thereto. In the infrastructure BSS including the AP, communication between non-AP STAs is made by way of the AP, but when a direct link has been established, the non-AP STAs can directly communicate with each other. The AP may be also called by other names such as centralized controller, base station (BS), node-B, base transceiver system (BTS), site controller, and the like.

A plurality of infrastructure BSSs may be connected via the DS 80. The plurality of BSSs connected via the DS 80 is called an extended service set (ESS). STAs included in the ESS may communicate with each other, and the non-AP STA may move from one BSS to another BSS in the same ESS while seamlessly performing communication.

The DS 80 is a mechanism allowing one AP to communicate another AP. Through the DS 80, an AP can transmit a frame for STAs associated to the BSS managed by the AP, transfer a frame when one STA moves to another BSS, or transmit or receive frames to and from an external network such as a wired network. The DS 80 is not necessarily a network. Namely, the DS 80 is not limited to any form so long as it can provide a certain distribution service defined in IEEE 802.11 standard. For example, the DS 80 may be a wireless network such as a mesh network or a physical structure connecting the APs.

Nomenclature in this description is as follows:

access category (AC): A label for the common set of enhanced distributed channel access (EDCA) parameters that are used by a quality of service (QoS) station to contend for the channel in order to transmit medium access control (MAC) service data units (MSDUs) with certain priorities.

access point (AP): Any entity that has station functionality and provides access to the distribution services, via the wireless medium (WM) for associated stations.

basic service area (BSA): The area containing the members of a basic service set (BSS). It may contain members of other basic service sets.

basic service set (BSS): A set of stations that have successfully synchronized. Membership in a BSS does not imply that wireless communication with all other members of the BSS is possible.

direct link: A bidirectional link from one non-access point (non-AP) quality of service (QoS) station (STA) to another non-AP QoS STA operating in the same infrastructure QoS basic service set that does not pass through a QoS access point (AP). Once a direct link has been set up, all frames between the two non-AP QoS STAs are exchanged directly.

enhanced distributed channel access (EDCA): The prioritized carrier sense multiple access with collision avoidance (CSMA/CA) access mechanism used by quality of service (QoS) stations (STAs) in a QoS basic service set. This access mechanism is also used by the QoS access point (AP) and operates concurrently with hybrid coordination function (HCF) controlled channel access (HCCA).

network allocation vector (NAV): An indicator, maintained by each station, of time periods when transmission onto the wireless medium (WM) will not be initiated by the station whether or not the station's clear channel assessment (CCA) function senses that the WM is busy.

non-AP quality of service (QoS) station (non-AP QSTA): A station (STA) that supports the QoS facility, but is not an access point (AP). A non-AP STA does not have an hybrid coordinator (HC) and uses the QAP for the distribution system services (DSSs).

non-QoS AP (non-QAP) or legacy AP: An access point (AP) that does not support the quality of service (QoS) facility.

non-QoS station (non-QSTA) or legacy non-AP STA: A station (STA) that does not support the quality of service (QoS) facility.

QoS access point (QAP): An access point (AP) that supports the QoS facility. The functions of a QAP are a superset of the functions of a non-QAP, and thus a QAP is able to function as a non-QAP to non-QSTAs.

QoS basic service set (QBSS): A basic service set (BSS) that provides the QoS facility.

An infrastructure QBSS contains a QoS access point.

QoS station (QSTA): A station (STA) that implements the QoS facility. A QSTA acts as a non-QSTA when associated in a non-QoS basic service set.

service period (SP): A contiguous time during which one or more downlink unicast frames are transmitted to a QSTA and/or one or more transmission opportunities (TXOPs) are granted to the same STA. SPs can be scheduled or unscheduled. For a non-AP STA, there can be at most one SP active at any time.

scheduled SP: The SP that is scheduled by the QAP. Scheduled SPs start at fixed intervals of time.

unscheduled SP: The period that is started when a non-AP QSTA transmits a trigger frame to the QAP.

medium access control (MAC) protocol data unit (MPDU): The unit of data exchanged between two peer MAC entities using the services of the physical layer (PHY).

medium access control (MAC) service data unit (MSDU): Information that is delivered as a unit between MAC service access points (SAPs).

traffic category (TC): A label for medium access control (MAC) service data units (MSDUs) that have a distinct user priority (UP), as viewed by higher layer entities, relative to other MSDUs provided for delivery over the same link. Traffic categories are meaningful only to MAC entities that support quality of service (QoS) within the MAC data service. These MAC entities determine the UP for MSDUs belonging to a particular traffic category using the priority value provided with those MSDUs at the MAC service access point (MAC_SAP).

traffic stream (TS): A set of medium access control (MAC) service data units (MSDUs) to be delivered subject to the QoS parameter values provided to the MAC in a particular traffic specification (TSPEC). TSs are meaningful only to MAC entities that support QoS within the MAC data service. These MAC entities determine the TSPEC applicable for delivery of MSDUs belonging to a particular TS using the TS identifier (TSID) value provided with those MSDUs at the MAC service access point (MAC_SAP).

traffic classification (TCLAS): The specification of certain parameter values to identify the medium access control (MAC) service data units (MSDUs) belonging to a particular traffic stream (TS). The classification process, performed above the MAC service access point (MAC_SAP) at a QoS access point, uses the parameter values for a given TS to examine each incoming MSDU and determine whether this MSDU belongs to that TS.

traffic identifier (TID): Any of the identifiers usable by higher layer entities to distinguish medium access control (MAC) service data units (MSDUs) to MAC entities that support quality of service (QoS) within the MAC data service. There are 16 possible TID values; 8 identify TCs, and the other 8 identify parameterized TSs. The TID is assigned to an MSDU in the layers above the MAC.

traffic specification (TSPEC): The quality of service (QoS) characteristics of a data flow to and from a non-AP QSTA.

tunneled direct link setup (TDLS): A protocol that uses a specific Ethertype encapsulation to tunnel direct link setup frames through an AP, to establish a direct link.

TDLS initiator: STA that transmits a TDLS Setup Request frame.

TDLS peer STA: STA with which a direct link has been established or is being established using the TDLS protocol.

peer unscheduled automatic power save delivery (U-APSD): A power save mode based on 35 unscheduled service periods that may be used between two STAs that have setup a direct link using TDLS.

peer power save mode (PSM): A power save mode based on scheduled service periods that may be 38 used between two STAs that have setup a direct link using TDLS.

peer unscheduled automatic power-save delivery (U-ASPD): A power save mode based on un scheduled service periods between two STAs that have setup a direct link using TDLS.

TDLS sleep STA: A TDLS peer STA that is in power save mode using Peer U-APSD.

TDLS buffer STA: A TDLS peer STA that buffers traffic for a TDLS sleep STA.

TDLS is characterized by the use of signaling frames that are encapsulated in data frames so that the signaling frames can be transmitted through an AP transparently. This means that the AP does not need to be direct link aware, nor does it have to support any of the capabilities which will be used on the direct link.

The WLAN system which implements the embodiments of the present invention supports TDLS. Hereinafter, a TDLS peer STA, a TDLS sleep STA and a TDLS buffer STA may be referred to as a peer STA, a sleep STA and a buffer STA, respectively. A STA is regarded as a non-AP STA unless there is any explicit different explanation in this description.

Even non-AP STAs associated with a legacy AP can set up a TDLS link as a direct link therebetween and tear down the direct link. In order that a STA sets up or tears down the TDLS link with a peer STA, the STA and the peer STA can exchange management frames through the legacy AP. However, the legacy AP cannot be directly involved in allowing two non-AP STAs to set up the TDLS link. To solve such a problem, encapsulated the TDLS frames are transmitted to the peer STA through the legacy AP. The legacy AP performs only a function of relaying the communication between the non-AP STAs and is not involved in setting up, tearing down, and managing the TDLS link. An embodiment described later can be usefully applied to the TDLS wireless network in which the TDLS frames encapsulated in the form of a data frame are transmitted for the purpose of setting up, tearing down, and managing the TDLS link.

The non-AP STA supports PSM in the TDLS. The PSM may be based on peer U-APSD. Support for Peer U-APSD means that the STA has the capability to buffer frames for the peer STA that operates in Peer U-APSD, and to deliver them during un-scheduled service periods. A buffer STA temporarily buffers data for a peer sleep STA in the PSM and transmits the buffered data to the peer STA through the TDLS link. The sleep STA can enter into the PSM without tearing down the TDLS link. The sleep STA can receive the data buffered in the buffer STA through the TDSL link.

Figure 2:
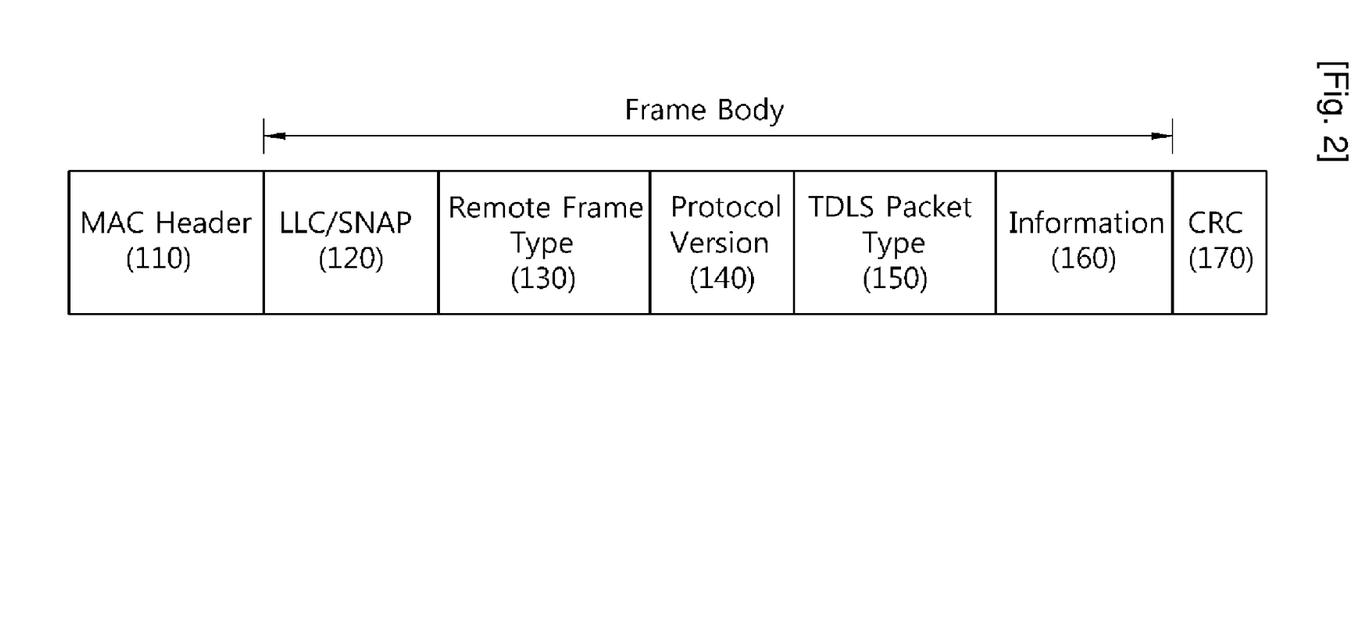
FIG. 2 is a diagram illustrating an example of a TDLS frame.

FIG. 2 is a diagram illustrating an example of a TDLS frame. A TDLS frame is a data frame which includes encapsulated TDLS managements such as TDLS setup, TDSL tear down, etc. A STA transmits the TDLS frame to a peer STA through a legacy AP. The TDLS frame includes a MAC header field 110, a logical link control (LLC)/sub-network access protocol (SNAP) field 120, a remote frame type field 130, a TDLS packet type field 140, and an information field 150.

The MAC header field 110 may include a frame control field, a duration/ID field, plural address fields (Address1, Address2, Address3, and Address4), a sequence control field, and/or a QoS control field. The frame control field includes a power management field indicating whether it operates in a PSM. The power management field of the frame control field indicates a mode in which the STA operates after exchange of a series of frames. The power management field is used to indicate the power management mode of a STA. The value of this field remains constant in each frame from a particular STA within a frame exchange sequence defined in 9.12. The value indicates the mode in which the station will be after the successful completion of the frame exchange sequence. A value of 1 indicates that the STA will be in PSM. A value of 0 indicates that the STA will be in active mode.

The QoS control field in the MAC header field 110 serves to identify a traffic category (TC) or a traffic stream (TS) to which the frame belongs and a variety of QoS-related information of the frame which varies depending on the frame type and the sub-frame type.

The LLC/SNAP field 120 includes an LLC/SNAP header. The remote frame type field 130 can be set to a value (for example, "2") indicating a TDLS frame.

The TDLS packet type field 140 is set to a value for specifying the type of the TDLS frame. Examples of the type of the TDLS frame and the value corresponding thereto are shown in Table 1.

TABLE 1

| Field Value | Meaning |
| --- | --- |
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |

Figure 3:
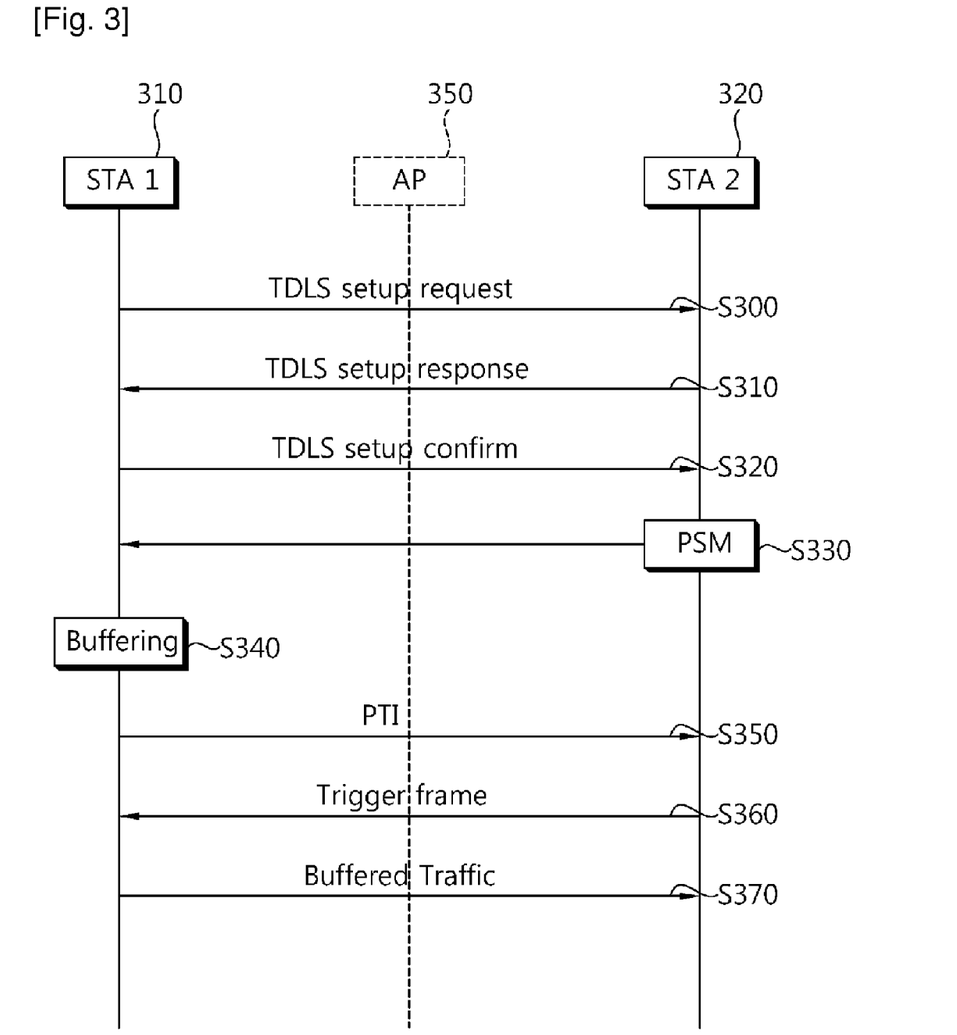
FIG. 3 is a diagram illustrating a communication method according to an embodiment of the present invention.

FIG. 3 is a diagram illustrating a communication method according to an embodiment of the present invention.

To establish a direct link, a STA1 310 which is a TDLS initiator transmits a TDLS request frame to a STA2 320 which is a peer STA (S300). The TDLS request frame is a TDLS frame which the TDLS packet type field 140 in the TDLS frame is set to a value '0'. The TDLS request is encapsulated in a data frame and is then transmitted. The AP 350 relays the TDLS request frame to the STA2 320 as a data frame.

The STA2 320 transmits a TDLS response frame to the STA1 310 via a AP 350 (S310). If STA2 320 accepts the TDLS setup request, STA2 320 respond with the TDLS response frame with a status 'successful'. If STA2 320 declines the TDLS setup request, STA2 320 respond with the TDLS response frame with a status 'declined'. If no TDLS Setup Response frame is received within a certain interval, the TDLS initiator 310 may terminates the setup procedure.

The STA1 310 sends a TDLS setup confirm frame to the peer STA 320 to confirm the receipt of the TDLS Setup Response frame.

After establishing TDLS, STA1 and STA2 can exchange traffic data through the direct link. During TDLS setup procedure, STA1 and STA2 can exchange support of peer U-APSD. Support for peer U-APSD means that the STA has the capability to buffer frames for the peer STA that operates in Peer U-APSD, and to deliver them during unscheduled service periods. A subfield in the TDLS setup request frame and/or the TDLS setup response frame may be set to indicate the support of peer U-APSD.

The STA2 320 enters PSM (S330). The STA2 320 may enter PSM by setting the power management field in the frame control field of an acknowledged MAC protocol data unit (MPDU) transmitted to the peer STA over the direct link. The STA2 320 notifies the STA1 310 of entering of PSM. A frame which includes the power management field set acts as an indicator indicating that the STA2 320 enters PSM. The STA that transmitted the frame with the power management field set is referred to as a sleep STA. The STA receiving the frame with the power management field set is referred to as a buffer STA. In this embodiment, it is shown that STA1 310 is a buffer STA and STA2 320 is a sleep STA. Otherwise, the STA2 320 may be a buffer STA and the STA1 310 may be a sleep STA. A sleep STA may be a buffer STA at the same time.

The buffer STA 310 buffers received traffic data frames (e.g. MSDUs) destined for the sleep STA 320 (S340).

The buffer STA 310 transmits a peer traffic indication (PTI) frame to the sleep STA 320 through the AP 350 (S350). The PTI frame is a TDLS frame which the TDLS packet type field 140 in the TDLS frame is set to a value '4'. The PTI is encapsulated in a data frame and is then transmitted. The PTI indicates the state of the power save buffer at the buffer STA 310 that is buffering data for a Peer STA 320 in PSM. Table 2 shows an example of information for the PTI frame.

TABLE 2

| Field | Notes |
| --- | --- |
| Category | This field represents TDLS |
| Action | This field represents TDLS peer traffic indication |
| AC_BK traffic available | set to 0 if AC_BK is empty and set to 1 if traffic is available in AC_BK. |
| AC_BE traffic available | set to 0 if AC_BE is empty and set to 1 if traffic is available in AC_BE. Values 2-255 are reserved |
| AC_VI traffic available | set to 0 if AC_VI is empty and set to 1 if traffic is available in AC_VI. |
| AC_VO traffic available | set to 0 if AC_VO is empty and set to 1 if traffic is available in AC_VO. |
| Link Identifier | information that identifies the direct link |
| TID | indicate the highest TID for which the peer STA has buffered traffic. |
| Sequence Control | The Sequence Control field is set to the sequence number of the latest MPDU transmitted to the sleep STA to which the PTI frame containing this element is addressed, from the TID indicated in the TID field. If a service period must always be triggered, the field is set to the highest value. |

In the IEEE 802.11e standard, there are four kinds of AC: AC_BE represents best effort, AC_BK represents background, AC_VI represents video and AC_VO represents voice. The PTI frame can indicate the non-empty AC(s) by setting the corresponding AC Traffic Available subfield to 1. The TID field can be set to the highest TID for which the peer STA has buffered traffic. The sequence control field can be set to the sequence number of the latest MPDU from the TID indicated in the TID field that has been transmitted to the sleep STA to which the PTI frame containing this element is addressed. If a service period must be triggered, the sequence control field may be set to the highest sequence number value.

The buffer STA 310 transmits the PTI frame to the sleep STA 320 if the following conditions are met: (1) a new frame arrives at the PU buffer STA, the new frame being destined for the sleep STA, (2) the frame buffer at the buffer STA contains no other frames with the same AC that are destined for the sleep STA, and (3) no SP has occurred for that AC and for the sleep STA, for a certain interval prior to the arrival of the new traffic.

The sleep STA 320 sends a trigger frame to the buffer STA 310 (S360). When the sleep STA 320 receives the PTI frame indicating that frames are buffered at the buffer STA 310 for one or more ACs, and the sleep STA 320 has not received from the buffer STA 310 an MPDU with a TID as indicated in the TID field of the PTI frame with a higher sequence number than the sequence number as indicated in the sequence number field in the sequence control field of the PTI frame, the sleep STA 320 can initiate an unscheduled SP with the buffer STA to retrieve the buffered MSDU(s) for the AC(s) for which no unscheduled SP is currently active.

The trigger frame indicates that the sleep STA 320 in the PSM wakes up and the power management mode is changed into active mode. The trigger frame may be a null data frame of which the power management bit field is set to "0" (value indicating the active mode). The trigger frame may further include information on the transmission path (direct link or other link) through which the sleep STA 320 hopes to receive the data frame from the buffer STA 310.

The buffer STA 310 received the trigger frame transmits one or more buffered traffic frame to the sleep STA 320 through the direct link (S370).

The sequence control field and the TID field in the PTI frame is used to prevent un-necessary allocation of SP due to invalid PTI transmission.

Figure 4:
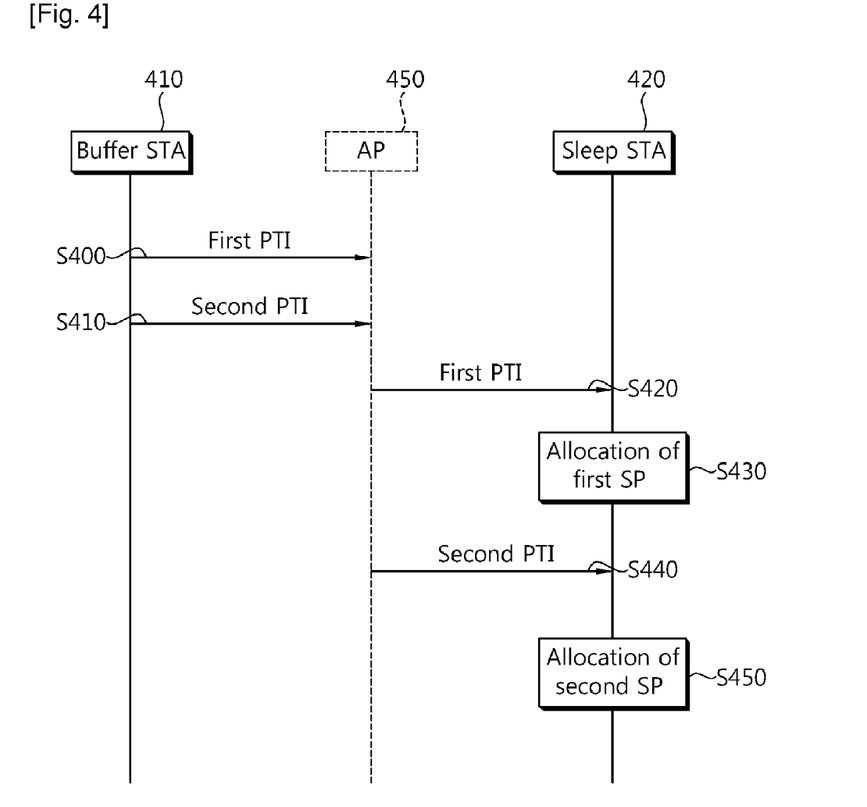
FIG. 4 is a diagram illustrating a problem due to invalid PTI transmission.

FIG. 4 is a diagram illustrating a problem due to invalid PTI transmission. A buffer STA 410 sends a first PTI frame to a AP 450 (S400). For any reason, the AP 450 may delay the relay of the first PTI frame. After a certain interval, the buffer STA 410 which does not receive any triggering of SP sends a second PTI frame to a AP 400 (S410). The second PTI frame is a duplication of the first PTI frame. The AP relays the first PTI frame to a sleep STA 420 (S420). The sleep STA allocates a first SP for the first PTI frame (S430). Allocation of SP means the sleep STA changes its power management mode into active mode and sends a trigger frame to the buffer STA 410. The AP relays the second PTI frame to a sleep STA 420 (S440). The sleep STA allocates a second SP for the second PTI frame (S450).

The first SP and the second SP are allocated for same traffic. The second SP is a duplicated SP and unnecessary radio resource.

To prevent unnecessary allocation of SP, the sleep STA 420 determines the duplication of PTI transmission by using the sequence control field and the TID field in the PTI frame. When the sleep STA 420 has not received from the buffer STA 410 an MPDU with a TID as indicated in the TID field of the PTI frame with a higher sequence number than the sequence number as indicated in the sequence number field in the sequence control field of the PTI frame, the sleep STA 420 allocates SP. For above cases, since the sleep STA 410 receives traffic through the first SP for the first PTI frame, the sleep STA 420 does not allocates the second SP for the second PTI frame. As a result, efficiency of radio resource allocation can be improved.

Figure 5:
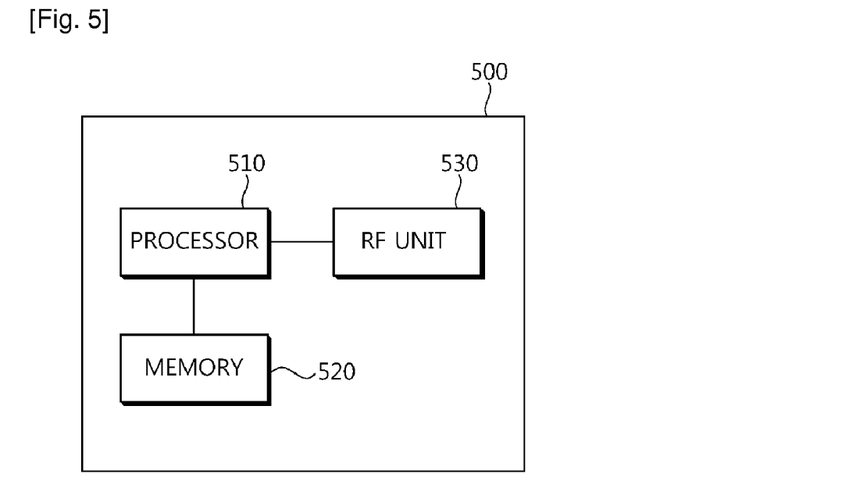
FIG. 5 is a block diagram of an apparatus for wireless communication to implement an embodiment of the present invention is implemented.

FIG. 5 is a block diagram of an apparatus for wireless communication to implement an embodiment of the present invention is implemented. An apparatus 500 may be a buffer STA or a sleep STA. The apparatus 500 includes a processor 510, a memory 520 and an RF (Radio Frequency) unit 530. The processor 510 implements a proposed function, process and/or method. Power management and TDLS setup can be performed by the processor 510. The memory 520 is operatively connected to the processor 510 and stores information for operating the processor 510. The RF unit 520 is operatively connected to the processor 510 and transmits and/or receives RF signals.

The processor 510 may include application-specific integrated circuit (ASIC), other chipset, logic circuit and/or data processing device. The memory 520 may include read-only memory (ROM), random access memory (RAM), flash memory, memory card, storage medium and/or other storage device. The RF unit 530 may include baseband circuitry to process radio frequency signals. When the embodiments are implemented in software, the techniques described herein can be implemented with modules (e.g., procedures, functions, and so on) that perform the functions described herein. The modules can be stored in memory 520 and executed by processor 510. The memory 520 can be implemented within the processor 510 or external to the processor 510 in which case those can be communicatively coupled to the processor 510 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of managing power save in a wireless network, the method comprising:
    establishing a direct link with a peer station (STA) by exchanging a Tunneled Direct Link Setup (TDLS) setup request frame and a TDLS setup response frame through an access point (AP);
    receiving an indicator indicating that the peer STA enters power save mode (PSM) via the direct link;
    buffering traffic data that are destined for the peer STA in the PSM; and
    transmitting a peer traffic indication (PTI) frame to the peer STA in the PSM, the PTI frame indicating that the traffic data for the peer STA in PSM is buffered,
    wherein the PTI frame includes a sequence control field set to a sequence number of a latest data unit transmitted to the peer STA and an access category (AC) traffic available field indicating whether buffered traffic associated with a predetermined AC is present.

2. The method of claim 1, wherein the PTI frame further includes a traffic identifier (TID) field indicating a highest TID for which the peer STA has buffered traffic.

3. The method of claim 1, wherein the PTI frame further includes information that identifies the direct link.

4. The method of claim 1, wherein the indicator is a power management field in a frame control field of a frame, and
    the peer STA enters the PSM after transmitting the power management field.

5. The method of claim 1, further comprising:
    receiving a trigger frame from the peer STA as a response to the PTI frame, the trigger frame indicating that the peer STA is in active mode.

6. The method of claim 1, wherein the TDLS setup request frame and a TDLS setup response frame are encapsulated in data frames in order to allow the TDLS setup request frame and the TDLS setup response frame to be transmitted through the AP transparently.

7. An apparatus for supporting Tunneled Direct Link Setup (TDLS), the apparatus comprising:
    a radio frequency (RF) unit to transmit and receive radio signals; and
    a processor operatively coupled with the RF unit and configured to:
    establish a direct link with a peer station (STA) by exchanging a (TDLS) setup request frame and a TDLS setup response frame through an access point (AP);
    receive an indicator indicating that the peer STA enters a power save mode (PSM) via the direct link;
    buffer traffic data that are destined for the peer STA in the PSM; and
    transmit a peer traffic indication (PTI) frame to the peer STA in the PSM, the PTI frame indicating that the traffic data for the peer STA in PSM is buffered,
    wherein the PTI frame includes a sequence control field set to a sequence number of a latest data unit transmitted to the peer STA and an access category (AC) traffic available field indicating whether buffered traffic associated with a predetermined AC is present.

* * * * *